(No Model.) 2 Sheets—Sheet 1.

C. H. SCHAAFF.
WEIGHING AND PRICE SCALE.

No. 537,996. Patented Apr. 23, 1895.

WITNESSES
Jas. L. Skidmore
M. Nash

INVENTOR
Charles H. Schaaff.
By Alvan Macauley,
Attorney.

THE NORRIS PETERS CO., PHOTO-LITHO., WASHINGTON, D. C.

(No Model.) 2 Sheets—Sheet 2.
C. H. SCHAAFF.
WEIGHING AND PRICE SCALE.
No. 537,996. Patented Apr. 23, 1895.
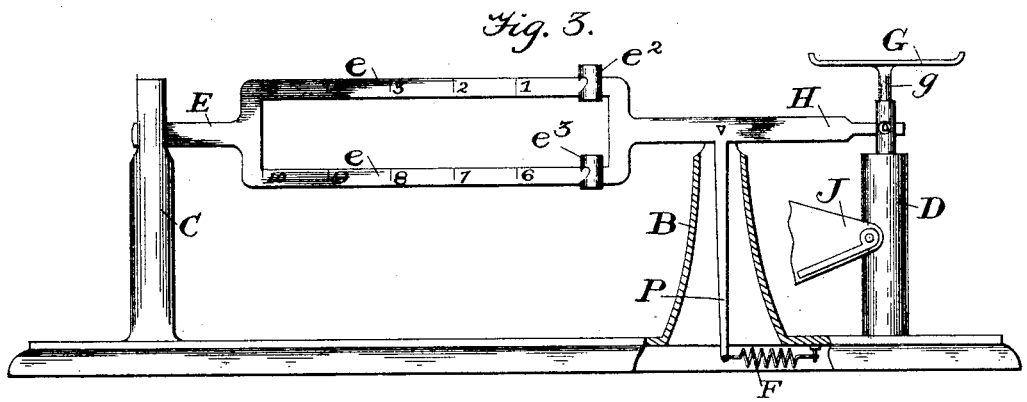
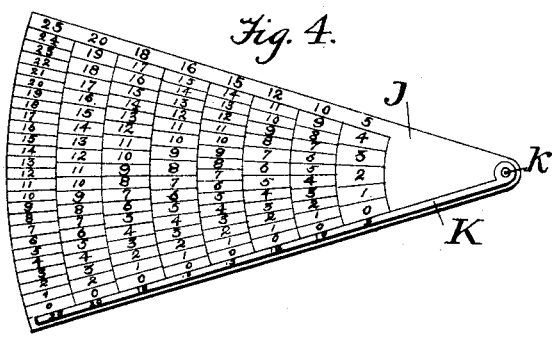
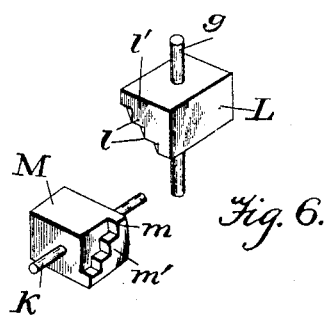
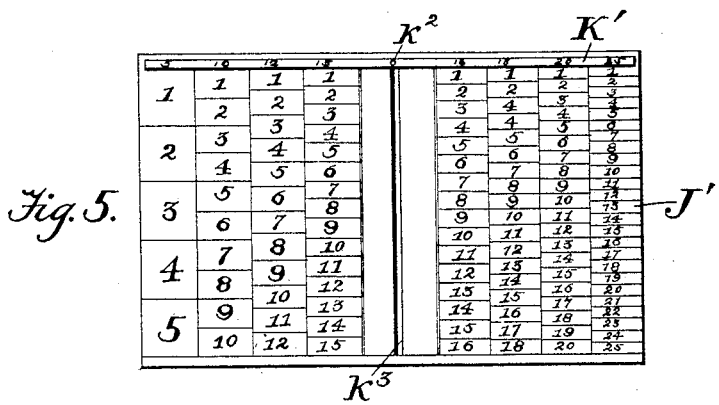
WITNESSES
Inventor
Charles H. Schaaff
By Alvan Macauley
Attorney

UNITED STATES PATENT OFFICE.

CHARLES H. SCHAAFF, OF WASHINGTON, DISTRICT OF COLUMBIA.

WEIGHING AND PRICE SCALE.

SPECIFICATION forming part of Letters Patent No. 537,996, dated April 23, 1895.

Application filed October 31, 1893. Serial No. 489,603. (No model.)

*To all whom it may concern:*

Be it known that I, CHARLES H. SCHAAFF, a citizen of the United States, residing at Washington, in the District of Columbia, have invented certain new and useful Improvements in Weighing and Price Scales; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to an improvement in weighing and price scales, and has for its object to provide a device of the class described by which the whole number of pounds of a given mass may be determined by means of a movable weight on a scale-beam and the fractions of a pound indicated automatically by a pointer moving over a scale-board and operatively connected with the scale-beam, so that the total weight of the mass is the sum of the amounts indicated on the scale-beam and on the scale-board.

Specific features of my invention relate to details of construction and to an arrangement of the scale-board and pointer whereby the value of the fractions indicated on the scale-board, will be shown.

Figure 1:
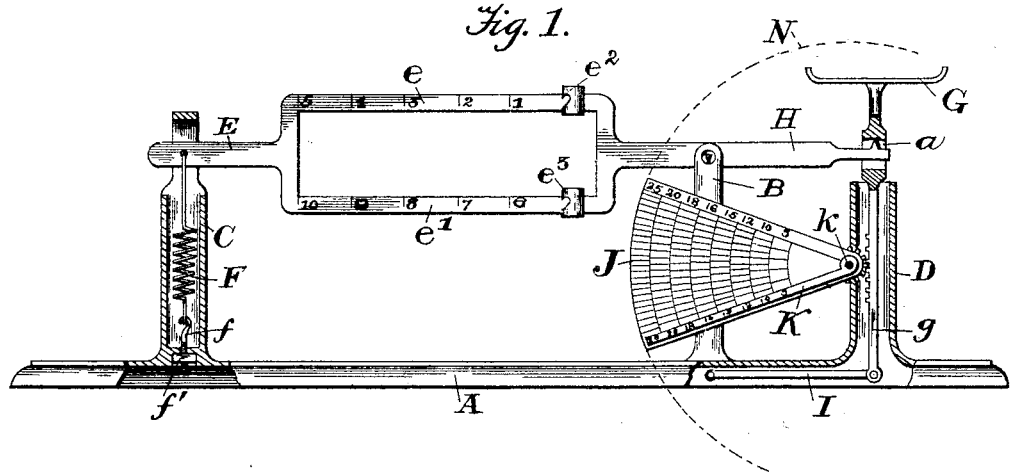
Figure 2:
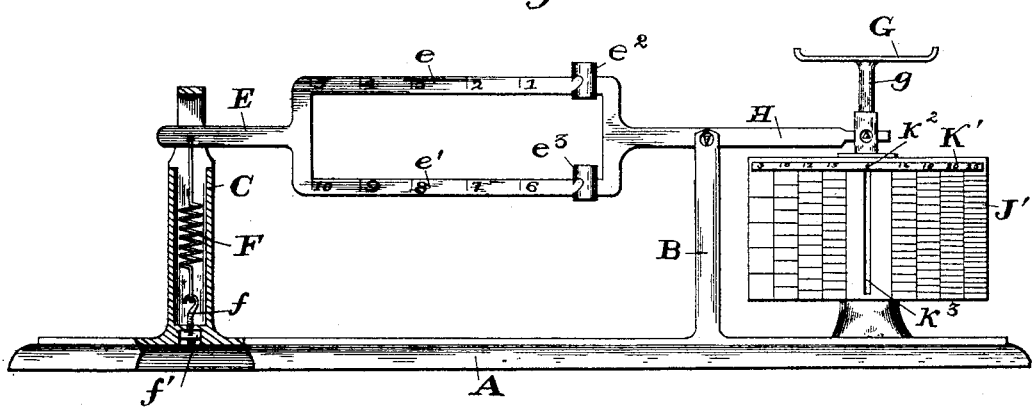

In the accompanying drawings which illustrate the invention, Figure 1 is a side-elevation of the scale complete, and showing one arrangement of the scale-board and pointer. Fig. 2 is a like view, showing a modified form of scale-board and pointer. Fig. 3 is a view showing the spring which maintains the balance of the scale-beam, placed in a position other than that shown in Fig. 1. Fig. 4 is an enlarged detail view of the scale-board shown in Fig. 1. Fig. 5 is an enlarged detail view of the scale-board shown in Fig. 2, and Fig. 6 is a detail perspective view of the rack-block which is secured on the standard that supports the scale-pan and of the segment-pinion which is secured on the shaft that bears the pointer.

Referring to the drawings, the letter A indicates the horizontal base of the scale-frame from which the pivot-post B, end post C, and scale-pan post D, project vertically upward.

The long arm E of the scale beam comprises two parallel weight arms, $e$, $e'$, on which slide the weights $e^2$, $e^3$. When desired, either of the weights may be used as a tare weight. The swinging end of the long arm E passes through and vibrates in a slot in the upper end of the hollow end post, and a spring F connects at one end with the swinging end of the long arm, and at the other is attached to a hook $f$, which is screw-threaded at one end and passes through the base of the scale-frame, and is held in position by a nut $f'$, which fits within a recess in the under side of the base. When in position within the recess, the nut is locked from turning.

If it is desired to change the tension of the spring, the hook is drawn down, which withdraws the nut from its recess. The desired adjustment is obtained by screwing up or unscrewing the nut, which is then released and the spring $f$ will draw it back into position. The scale-pan G is supported on an upright rod or standard $g$, which is pivoted on the extremity of the short arm H of the scale-beam. The rod I, jointed at one end to the base A and at the other to the lower end of the upright scale-pan standard, is of the same length as the short arm of the scale-beam, and operates to keep the scale-pan standard always in an upright position.

The scale-board J, as shown in Fig. 1, is made in the form of the sector of a circle, at the center of which, on a transverse shaft $k$, is pivoted the indicator or pointer K. The scale-board, as shown in the drawings, is fastened to the pivot-post and also to the scale-pan post. By means of suitable mechanism, the indicator or pointer is operatively connected with the scale-pan standard $g$, whereby the movement up and down of the said standard will cause the indicator or pointer to move correspondingly over the scale-board. In Fig. 1 a simple rack-bar and pinion connection is shown between the indicator shaft and the scale-pan standard; but for reasons which will be afterward set forth, I prefer to use the mechanism shown in Fig. 6 of the drawings, and which consists of the rack-block L, which is secured on the scale-pan standard and which is provided with an inclined series of teeth $l$, and a segment pinion M, which is secured on the indicator shaft and has one surface curved to conform to the arc of a circle described from the center of the indicator shaft as a center. On the curved surface $m'$, the segment pinion is provided with a series of inclined teeth $m$, which correspond to the teeth on the rack-block except that they follow the curve of the curved surface $m'$, in which they differ from the teeth of the rack-block, which are formed on the plane surface $l'$.

Fig. 2 illustrates a form of the device in which a modified scale-board $J'$ is used, and in which the transverse pointer $K'$ is secured rigidly to the scale-pan standard by a pin $k^2$, which passes through a vertical slot $k^3$ in the scale-board $J'$. The slot $k^3$ extends also through the scale-pan post, so that as the scale-pan standard moves up and down the pointer will move directly with it and will pass over the scale-board $J'$.

Referring to the rack-block and segment pinion, it may be stated that the advantage of using this form of connection between the scale-pan standard and the indicator shaft lies in the fact that the engagement of the rack-block with the segment-pinion is always such that when the scale-pan standard is raised, the rack-block will be raised out of engagement with the segment-pinion, so that in lifting the scale from place to place, if a person takes hold of the scale-pan standard, there will not be any strain exerted on the indicator, as might be the case if the rack-bar and pinion connection shown in Fig. 1 were employed.

The scale-board shown in Fig. 1 is represented in the form of a sector of a circle, but for some purposes it might be preferable to make the scale-board circular, as indicated by the dotted lines $N$ (Fig. 1).

As before stated, the indicator and scale-board as shown are to be used to indicate fractions of a pound and amounts up to one pound.

I have shown in detail in Figs. 4 and 5 a convenient arrangement of the scale-boards as shown in Figs. 1 and 2 of the drawings. I divide the face of the scale-board into a number of price columns, and each column is divided into a number of parts. Each column will be used in weighing goods of a certain price. As shown in the drawings, arrangements are made for weighing goods where the price is five, ten, twelve, fifteen, sixteen, eighteen, twenty and twenty-five cents a pound, though of course this arrangement may be varied to suit the convenience of the user. If the scale-beam be in balanced position and a pound weight be placed in the scale pan, the scale-pan standard will be depressed just sufficient to move the indicator or pointer the full length of the price columns. A half pound weight in the scale-pan will cause the pointer to move half the length of the price columns, &c. On this account I have divided the 5c. column into five parts, the 10c. column into ten parts, the 12c. column into twelve parts, &c., and each part or division of the several price columns represents a cent, so that, for example, ten cents' worth of goods at twelve cents a pound will move the pointer to the 10 mark in the 12c. column; fifteen cents' worth of goods at twenty-five cents a pound will move the pointer to the 15 mark in the 25c. column, &c. I prefer to have one of the columns divided into sixteen parts, so that besides indicating the value of any fraction of a pound of material worth sixteen cents a pound, it will also indicate the weight in ounces.

On the indicator or pointer are numerals corresponding respectively to the highest numbers in the several price columns.

The manner of using the scale as thus described, is as follows: If it is desired to determine the weight and value of an amount of material selling at twenty-five cents per pound, the material is placed in the scale-pan, which if the mass to be weighed exceeds one pound immediately descends and throws the pointer the full length of the price columns. One of the weights $e^2$, $e^3$ is moved out from mark to mark along its weight arm till it reaches that mark at which the scale pan begins to rise, turning the pointer back as it moves. If the mass in the scale-pan be sufficiently heavy, it will be necessary to use both of the weights, but for ordinary purposes, only one is required. The pointer will finally come to rest at some particular point. The whole number of pounds will be indicated by that division of the weight-arm at which the weight $e^2$ is set (and for the purpose of illustration I will assume this to be four). Then the value of the whole number of pounds of the material is one dollar. The value of the fractional weight of the material over four pounds will be found directly by reference to that number on the 25c. column which is indicated by the pointer. I will assume this to be the 10 mark, so that the total value of the material in the scale-pan is one dollar plus ten cents, or one dollar and ten cents. The weight in ounces of the fractional part of the material beyond four pounds can be ascertained directly by reference to the 16 column. Under the present hypothesis, this will be six, so that the total weight of the material will be four pounds plus six ounces, or four pounds, six ounces.

I have thus far described the scale as it is illustrated in Figs. 1 and 2 of the drawings, but my invention is not limited to this specific form. The spring F, for instance, which is therein shown as connected to the long arm of the scale-beam, may be arranged in various other ways, one of which is illustrated in Fig. 3 of the drawings, wherein an arm P, rigidly secured to the scale-beam, projects downwardly, preferably through the hollow pivot post, and the spring F is attached to the said arm, at its lower end; but the operation in both cases is the same.

It will be noticed that in the balanced position of the scale-beam the spring is not called into play at all, and it is only when weighing fractions and amounts up to and including a pound that the spring comes into use. In other words, the spring regulates the movement of the indicator.

For some uses, it is preferable to have the scale-board located in a position above the scale-beam, and my invention is not limited to the specific construction shown, as the position of the scale-board may be varied without departing from the spirit of my invention.

My invention may be added as an attachment to most of the existing styles of scales, and by its use a saving of considerable time is effected in striking a balance. In applying my invention to large platform scales, for instance, the spring might be made to control say five pounds, in which event the beam would be divided into five pound sections and the scale-board would then be made to indicate any amount up to and including five pounds.

Having thus described my invention, what I claim as new, and desire to secure by Letters Patent, is—

1. In a device of the class described, the combination of the scale-beam having one arm bearing a movable weight and a second arm bearing the scale-pan, a fixed scale-board and a pivoted pointer arranged to move over the scale-board and in direct operative connection with the said second arm of the scale-beam, whereby a movement thereof will cause a corresponding movement of the pointer.

2. In a device of the class described, the combination of the scale-beam having one arm bearing a movable weight and a second arm bearing a scale-pan standard, a scale-pan carried by the scale-pan standard, a fixed scale board and a pointer arranged to move over the scale-board and in direct operative connection with the scale-pan standard.

3. In a device of the class described, the combination of the scale-beam provided with movable weights, a scale-pan standard pivotally mounted upon the scale-beam and arranged to have a constantly vertical position, a scale-pan carried by the scale-pan standard, a fixed scale-board having columns subdivided into spaces containing characters indicating the value or price of fractions of a pound of the material or article weighed and a pointer arranged to move over the scale-board and in direct operative connection with the scale-pan standard.

4. In a device of the class described, the combination of a spring-controlled scale beam having one arm bearing a movable weight and a second arm bearing the scale-pan, a fixed scale board and a pivoted pointer arranged to move over the scale-board and in direct operative connection with the said second arm of the scale-beam, whereby a movement thereof will cause a corresponding movement of the pointer.

5. In a device of the class described, the combination of a spring-controlled scale-beam having one arm bearing a movable weight and a second arm bearing a scale-pan standard, a scale-pan carried by the scale-pan standard, a fixed scale-board and a pointer arranged to move over the scale-board and in direct operative connection with the scale-pan standard.

6. In a device of the class described, the combination of a spring-controlled scale-beam provided with movable weights, a scale-pan standard pivotally mounted upon the scale-beam and arranged to have a constantly vertical position, a scale-pan carried by the scale-pan standard, a fixed scale-board having columns subdivided into spaces containing characters indicating the value or price of fractions of a pound of a material or article weighed, and a pointer arranged to move over the scale-board and in direct operative connection with the scale-pan standard.

7. In a device of the class described, the combination of the scale-pan and its standard, the pivoted scale-beam bearing a movable weight and pivotally connected to the standard, the pivoted pointer in operative connection with the scale-pan standard, and a scale-board over which the pointer is arranged to move, substantially as described.

8. In a device of the class described, the combination of the scale-beam provided with a movable weight, a scale-pan standard pivotally mounted upon the scale-beam, a scale-pan carried by the scale-pan standard, a fixed scale-board having a number of columns subdivided into spaces containing numerals indicating the value or price of fractions of a pound of material or articles weighed and a pointer arranged to move over the scale-board in direct operative connection with the scale-beam and provided with a number of characters corresponding to the number of columns on the scale-board,—the value of each of said characters being equal to that of the highest numeral in the corresponding column on the scale-board.

9. In a device of the class described, the combination with the scale-beam pivoted between its ends, thus forming a long arm and a short arm, and adapted to indicate the weight of a portion of a given mass a spring attached at one end to the long arm and having its other end fixed, an upright standard pivotally supported on the short arm, a scale-pan carried by the standard, a rack-bar also carried by the standard, a scale-board, a pointer movable over the scale-board, and adapted to indicate on the scale-board the weight and the value at a given price per pound of the remaining portion of the given mass and teeth carried by the pointer and engaging the rack-bar on the standard.

10. In a device of the class described, the combination with the scale-beam pivoted between its ends, thus forming a long arm and a short arm, a spring attached at one end to the long arm and having its other end fixed, an upright standard pivotally supported on the short arm and carrying a scale-pan, a scale-board and a pointer carried by the standard and adapted to play over the scale-board, as shown.

11. In a device of the class described, the combination with the scale-beam pivoted between its ends, thus forming a long arm and a short arm, a spring attached at one end to the long arm and having its other end fixed, an upright standard pivotally supported on the short arm and bearing a scale-pan, a rack-block carried by the standard, a scale-board, a pointer mounted on a shaft and movable over the scale-board, and a segment-pinion carried by the pointer shaft and adapted to engage the rack-block on the standard.

12. In a device of the class described, the combination of the scale-beam, pivotally supported on the pivot-post and comprising a long arm vibrating in a slot in a hollow end-post, a scale-pan standard bearing a scale-pan and pivotally supported on the short arm of the scale-beam, and vertically movable in the hollow scale-pan post, a spring in the hollow end-post, fixed at one end and attached at the other to the long arm of the scale-beam, a scale-board and a pointer moving over the scale-board and operatively connected with the scale-pan standard, substantially as described.

In testimony whereof I affix my signature in presence of two witnesses.

CHARLES H. SCHAAFF.

Witnesses:
ALVAN MACAULEY,
JOS. ATKINS.